US012674012B2

(12) United States Patent
Seo et al.

(10) Patent No.: US 12,674,012 B2
(45) Date of Patent: Jul. 7, 2026

(54) METHOD OF PREPARING POLYMER

(71) Applicant: LG CHEM, LTD., Seoul (KR)

(72) Inventors: Jae Bum Seo, Daejeon (KR); Dae Woo Lee, Daejeon (KR); Jung Tae Park, Daejeon (KR); Jung Rae Lee, Daejeon (KR); Ji Uk Jang, Daejeon (KR); Kyeong Soo Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 720 days.

(21) Appl. No.: 18/035,450

(22) PCT Filed: Aug. 17, 2022

(86) PCT No.: PCT/KR2022/012259
§ 371 (c)(1),
(2) Date: May 4, 2023

(87) PCT Pub. No.: WO2023/063557
PCT Pub. Date: Apr. 20, 2023

(65) Prior Publication Data
US 2024/0002568 A1 Jan. 4, 2024

(30) Foreign Application Priority Data

Oct. 12, 2021 (KR) ........................ 10-2021-0135257
Aug. 16, 2022 (KR) ........................ 10-2022-0102253

(51) Int. Cl.
*C08F 222/30* (2006.01)
*C08F 2/00* (2006.01)

(52) U.S. Cl.
CPC ............ *C08F 222/30* (2013.01); *C08F 2/001* (2013.01)

(58) Field of Classification Search
CPC .......... C08F 222/30; C08F 2/001; C08F 2/06; C08F 279/04; C08F 220/14; C08F 212/08; C08F 220/44; C08L 33/20; C08L 51/003
See application file for complete search history.

(56) References Cited

U.S. PATENT DOCUMENTS

| | | | |
|---|---|---|---|
| 4,141,934 A | 2/1979 | Wingler et al. | |
| 5,618,901 A | 4/1997 | Smierciak et al. | |

| | | | | |
|---|---|---|---|---|
| 2009/0215960 A1* | 8/2009 | Jin | ......................... | C08L 51/003 525/94 |
| 2010/0105840 A1 | 4/2010 | Jin et al. | | |
| 2011/0160396 A1 | 6/2011 | Jin et al. | | |
| 2020/0040115 A1 | 2/2020 | Seo et al. | | |
| 2021/0230333 A1 | 7/2021 | Jo et al. | | |

FOREIGN PATENT DOCUMENTS

| | | |
|---|---|---|
| CN | 85103737 B | 11/1988 |
| CN | 109890856 A | 6/2019 |
| CN | 112105690 A | 12/2020 |
| JP | S63-005413 B2 | 2/1988 |
| JP | H09-087333 A | 3/1997 |
| JP | 3390529 B2 | 3/2003 |
| JP | 5565923 B2 | 8/2014 |
| KR | 10-0425565 B1 | 7/2004 |
| KR | 2005-0044175 A | 5/2005 |
| KR | 10-2008-0035214 A | 4/2008 |
| KR | 10-2008-0042485 A | 5/2008 |
| KR | 10-2010-0047672 A | 5/2010 |
| KR | 2010-0062418 A | 6/2010 |
| KR | 10-2011-0079055 A | 7/2011 |
| KR | 10-2019-0013569 A | 2/2019 |
| KR | 10-2021-0029677 A | 3/2021 |

OTHER PUBLICATIONS

English translation of KR20210029677A (Year: 2021).*
International Search Report (with partial translation) and Written Opinion dated Nov. 18, 2022, for corresponding International Patent Application No. PCT/KR2022/012259.
CN Office Action issued in application 202280007276.5 dated Aug. 31, 2024.
Extended European Search Report issued in application 22879636.3 dated Mar. 21, 2024.

* cited by examiner

*Primary Examiner* — Alicia Bland
(74) *Attorney, Agent, or Firm* — Morgan, Lewis & Bockius LLP

(57) ABSTRACT

The present disclosure relates to a method of preparing a polymer including preparing a first polymer mixture by polymerizing while continuously adding a monomer mixture comprising a (meth)acrylate-based monomer, a vinyl aromatic monomer, and a first vinyl cyanide-based monomer to a first reactor; and preparing a second polymer mixture by polymerizing while continuously adding a second vinyl cyanide-based monomer and the first polymer mixture to a second reactor, wherein a starting time of the continuous addition of the second vinyl cyanide-based monomer and the first polymer mixture is a time when a polymerization conversion rate is 40.0 to 55.0%, and a weight ratio of the first vinyl cyanide-based monomer and the second vinyl cyanide-based monomer is 10:90 to 35:65.

9 Claims, No Drawings

METHOD OF PREPARING POLYMER

TECHNICAL FIELD

Cross-Citation with Related Applications

The present invention claims the benefit of priority based on Korean Patent Application No. 10-2021-0135257, filed on Oct. 12, 2021 and Korean Patent Application No. 10-2022-0102253, filed on Aug. 16, 2022, all contents disclosed in the literature of the corresponding Korean patent applications are incorporated as a part of this specification.

Technical Field

The present invention relates to a method of preparing a polymer, and more particularly, to a method of preparing a polymer having excellent alcohol resistance, impact resistance, and transparency.

Background Art

Acrylic polymers prepared by polymerizing (meth)acrylate-based monomers, vinyl aromatic monomers, and vinyl cyanide-based monomers have excellent transparency as well as excellent formability, rigidity, and electrical properties, so that the acrylic polymers are widely used in various industrial fields such as office equipment, home appliances, automobile parts, and miscellaneous goods.

Since such an acrylic polymer contains a high content of (meth)acrylate-based monomer units in order to realize excellent transparency, alcohol resistance is very weak. However, since the use of alcohol disinfectants has recently increased due to COVID-19, when all of the alcohol resistance, impact resistance, and transparency are not excellent, the use of the acrylic polymer is inevitably limited.

Accordingly, there is a demand for the development of an acrylic polymer having excellent alcohol resistance, impact resistance, and transparency.

RELATED ART DOCUMENT

Patent Document (Patent Document 1) JP3390529B

TECHNICAL PROBLEM

The problem to be solved by the present invention is to prepare a polymer having excellent alcohol resistance, impact resistance, and transparency.

(1) The present invention provides a method of preparing a polymer, comprising: preparing a first polymer mixture by polymerizing while continuously adding a monomer mixture comprising a (meth)acrylate-based monomer, a vinyl aromatic monomer, and a first vinyl cyanide-based monomer to a first reactor; and preparing a second polymer mixture by polymerizing while continuously adding a second vinyl cyanide-based monomer and the first polymer mixture to a second reactor, wherein a starting time of the continuous addition of the second vinyl cyanide-based monomer and the first polymer mixture is a time when a polymerization conversion rate is 40.0 to 55.0%, and a weight ratio of the first vinyl cyanide-based monomer and the second vinyl cyanide-based monomer is 10:90 to 35:65.

(2) The present invention provides the method of preparing a polymer of (1), wherein the starting time of the continuous addition of the second vinyl cyanide-based monomer and the first polymer mixture is a time when the polymerization conversion rate is 40.0 to 50.0%.

(3) The present invention provides the method of preparing a polymer of (1) or (2), wherein the weight ratio of the first vinyl cyanide-based monomer and the second vinyl cyanide-based monomer is 20:80 to 30:70.

(4) The present invention provides the method of preparing a polymer of any one of (1) to (3), wherein a sum of a content of the first vinyl cyanide-based monomer and the second vinyl cyanide-based monomer is 20 to 30 parts by weight based on 100 parts by weight of a total amount of monomers added in the method of preparing the polymer.

(5) The present invention provides the method of preparing a polymer of any one of (1) to (4), wherein a content of the (meth)acrylate-based monomer is 50 to 65 parts by weight based on 100 parts by weight of a total amount of monomers added in the method of preparing the polymer.

(6) The present invention provides the method of preparing a polymer of any one of (1) to (5), wherein a content of the vinyl aromatic monomer is 15 to 25 parts by weight based on 100 parts by weight of a total amount of monomers added in the method of preparing the polymer.

(7) The present invention provides the method preparing a polymer of any one of (1) to (6), wherein an internal temperature of the second reactor is higher than an internal temperature of the first reactor.

(8) The present invention provides the method of preparing a polymer of (7), wherein the internal temperature of each of the first reactor and the second reactor is 130 to 150° C.

(9) The present invention provides the method of preparing a polymer of any one of (1) to (7), wherein the polymerization is continuous polymerization.

Effects of the Invention

According to a method of preparing a polymer of the present invention, a polymer having excellent alcohol resistance, impact resistance, and transparency can be prepared.

MODES OF THE INVENTION

Hereinafter, the present invention will be described in more detail to help the understanding of the present invention.

At this time, the terms or words used in the specification and claims should not be interpreted as being limited to conventional or dictionary meanings, and the terms or words should be interpreted as a meaning and a concept that are consistent with the technical concept of the present invention based on the principle that the inventor can appropriately define the concepts of terms in order to explain his/her own invention in the best way.

The term '(meth)acrylate-based monomer' used in the present invention may mean an alkyl (meth)acrylate-based monomer. The (meth)acrylate-based monomer may be a term that encompasses both an acrylate-based monomer and a methacrylate-based monomer. The alkyl (meth)acrylate-based monomer may be one or more selected from the group consisting of a methyl (meth)acrylate-based monomer, an ethyl (meth)acrylate-based monomer, a propyl (meth)acrylate-based monomer, and a butyl (meth)acrylate-based monomer, and among them, methyl methacrylate having excellent effects of improving transparency and scratch resistance is preferable.

In addition, the unit derived from the '(meth)acrylate-based monomer' may be a '(meth)acrylate-based monomer unit'.

The term 'vinyl aromatic monomer' used in the present invention may be at least one selected from the group consisting of styrene, 4-fluorostyrene, 4-chlorostyrene, 2-chlorostyrene, 4-bromostyrene, 2-bromostyrene, α-methyl styrene, p-methyl styrene, and 2,4-dimethyl styrene, and among them, styrene having excellent processability is preferable.

In addition, the unit derived from the 'vinyl aromatic monomer' may be a 'vinyl aromatic monomer unit'.

The term 'vinyl cyanide-based monomer' used in the present invention may mean one or more selected from the group consisting of acrylonitrile, 2-methylacrylonitrile, 2-ethylacrylonitrile, and 2-chloroacrylonitrile. Among them, acrylonitrile excellent in a chemical resistance improvement effect is preferable.

In addition, the unit derived from the 'vinyl cyanide-based monomer' may be a 'vinyl cyanide-based monomer unit'.

The term 'monomer mixture' used in the present invention may mean a mixture containing no polymer at all.

As used herein, the term 'polymer mixture' may mean a mixture containing even a small amount of a polymer.

The term 'polymerization conversion rate' used in the present invention may be calculated by the following equation:

$$\text{Polymerization conversion rate (\%)} = \{(\text{total weight of monomers added until polymerization is completed}) - (\text{total weight of unreacted monomers at the time when polymerization conversion rate is measured})\} / (\text{total weight of monomers added until polymerization is completed}) \times 100$$

The term 'polymerization' used in the present invention may be 'continuous polymerization' in which heat removal is easy during polymerization and which can prepare a polymer having uniform physical properties.

The term 'polymerization' used in the present invention may be 'bulk polymerization,' and unlike general bulk polymerization in which no solvent is used, a small amount of solvent may be used. When a solvent is used, it can be called 'solution polymerization'.

Method of Preparing Polymer

A method of preparing a polymer according to one embodiment of the present invention comprises 1) preparing a first polymer mixture by polymerizing while continuously adding a monomer mixture comprising a (meth)acrylate-based monomer, a vinyl aromatic monomer, and a first vinyl cyanide-based monomer to a first reactor; and 2) preparing a second polymer mixture by polymerizing while continuously adding a second vinyl cyanide-based monomer and the first polymer mixture to a second reactor, wherein the starting time of the continuous addition of the second vinyl cyanide-based monomer and the first polymer mixture is a time when a polymerization conversion rate is 40.0 to 55.0%, and a weight ratio of the first vinyl cyanide-based monomer and the second vinyl cyanide-based monomer is 10:90 to 35:65.

Hereinafter, the method of preparing a polymer according to one embodiment of the present invention will be described in detail.

1) Preparation of First Polymer Mixture

First, a monomer mixture comprising a (meth)acrylate-based monomer, a vinyl aromatic monomer, and a first vinyl cyanide-based monomer is continuously added to a first reactor and polymerized to prepare a first polymer mixture.

A content of the (meth)acrylate-based monomer in the monomer mixture may be 62.0 to 80.0 parts by weight, preferably 67.0 to 75.0 parts by weight, based on 100 parts by weight of a total amount of the (meth)acrylate-based monomer, the vinyl aromatic monomer, and the first vinyl cyanide-based monomer in the monomer mixture. When the above-described conditions are satisfied, a polymer having excellent transparency can be prepared.

A content of the vinyl aromatic monomer in the monomer mixture may be 15.0 to 30.0 parts by weight, preferably 18.0 to 26.0 parts by weight, based on 100 parts by weight of a total amount of the (meth)acrylate-based monomer, the vinyl aromatic monomer, and the first vinyl cyanide-based monomer in the monomer mixture. When the above-described conditions are satisfied, a polymer having excellent processability and impact resistance can be prepared.

A content of the vinyl cyanide-based monomer in the monomer mixture may be 1.0 to 15.0 parts by weight, preferably 4.0 to 10.0 parts by weight, based on 100 parts by weight of a total amount of the (meth)acrylate-based monomer, the vinyl aromatic monomer, and the first vinyl cyanide-based monomer in the monomer mixture. When the above conditions are satisfied, a polymer having improved chemical resistance can be prepared while yellowing is minimized. In addition, it is possible to prepare a polymer having excellent color and transparency by preventing a polymerization conversion rate from being excessively increased in the initial stage of polymerization.

The (meth)acrylate-based monomer and the vinyl aromatic-based monomer are preferably added only to the first reactor in order to increase a content of the vinyl cyanide-based monomer unit in the polymer, which is a final product.

Meanwhile, the monomer mixture may further comprise an initiator and a solvent.

The initiator may be at least one selected from the group consisting of 1,1-bis(t-butylperoxy)cyclohexane, 1,1-bis(t-butylperoxy)-2-methylcyclohexane, 1,1-bis(t-butylperoxy)-3,3,5-trimethylcyclohexane, and 2,2-bis(t-butylperoxy)butane.

A content of the initiator may be 0.01 to 1.00 parts by weight, preferably 0.01 to 0.50 parts by weight, based on 100 parts by weight of a total amount of monomers added in the method of preparing the polymer. When the above-described range is satisfied, polymerization can be stably performed.

The solvent may be at least one selected from the group consisting of methyl ethyl ketone, ethylbenzene, toluene, carbon tetrachloride, and chloroform.

A content of the solvent may be 20.0 parts by weight or less based on 100 parts by weight of a total amount of monomers added in the method of preparing the polymer in order to prevent the polymerization from not being performed smoothly due to a decrease in viscosity of the monomer mixture.

The internal temperature of the first reactor may be 130 to 150° C., preferably 130 to 145° C. When the above-described conditions are satisfied, the phase transition from the monomer to the polymer may be facilitated.

2) Preparation of Second Polymer Mixture

Then, a second vinyl cyanide-based monomer and the first polymer mixture are continuously added to a second reactor and polymerized to prepare a second polymer mixture.

In this case, the starting time of the continuous addition of the second vinyl cyanide-based monomer and the first polymer mixture may be a time when the polymerization conversion rate is 40.0 to 55.0%, preferably 40.0 to 50.0%. When the continuous addition of the second vinyl cyanide-based monomer and the first polymer mixture is started at a time earlier than the above-described time point, even when a content of the vinyl cyanide-based monomer unit in the polymer is the same, alcohol resistance is significantly deteriorated, yellow is expressed due to the vinyl cyanide-based monomer unit in the polymer, and thus both color characteristics and transparency are deteriorated. Also, a polymer with a uniform composition is not prepared throughout polymerization, resulting in deteriorated impact resistance. When the continuous addition of the second vinyl cyanide-based monomer and the first polymer mixture is started at a later time than the above-described time point, a content of the vinyl cyanide-based monomer unit in the polymer, which is a final product, does not increase, so that alcohol resistance is deteriorated.

Meanwhile, the weight ratio of the first vinyl cyanide-based monomer and the second vinyl cyanide-based monomer may be 10:90 to 35:65, preferably 20:80 to 30:70. When the above-described conditions are satisfied, a polymer uniformly comprising a vinyl cyanide-based monomer unit is prepared throughout polymerization, and thus the transparency, color characteristics, impact resistance, and alcohol resistance of the polymer can all be excellent. When the first vinyl cyanide-based monomer is comprised in a smaller amount than the above-described conditions, the transparency, impact resistance, and alcohol resistance of the polymer are deteriorated. When the first vinyl cyanide-based monomer is comprised in excess than the above-described conditions, the impact resistance and alcohol resistance of the polymer are deteriorated.

A sum of a content of the first vinyl cyanide-based monomer and the second vinyl cyanide-based monomer may be 20.0 to 35.0 parts by weight, preferably 20.0 to 30.0 parts by weight, based on 100 parts by weight of a total amount of monomers added in the method of preparing the polymer. When the above-described range is satisfied, a polymer having excellent alcohol resistance, improved rigidity, and excellent impact resistance can be prepared.

A content of the (meth)acrylate-based monomer may be 50.0 to 65.0 parts by weight, preferably 50.0 to 60.0 parts by weight, based on 100 parts by weight of a total amount of monomers added in the method of preparing the polymer. When the above-described range is satisfied, a polymer having excellent transparency and color characteristics can be prepared.

A content of the vinyl aromatic monomer may be 15.0 to 25.0 parts by weight, preferably 15.0 to 20.0 parts by weight, based on 100 parts by weight of a total amount of monomers added in the method of preparing the polymer. When the above-described range is satisfied, a polymer having excellent processability can be prepared.

The internal temperature of the second reactor may be higher than the internal temperature of the first reactor in order to increase the final polymerization conversion rate, and it may be preferably 5 to 15° C., more preferably 7 to 13° C. higher. In addition, the internal temperature of the second reactor may be 130 to 150° C., preferably 140 to 150° C. When the above-described conditions are satisfied, the final polymerization conversion rate can be increased, so that preparation efficiency can be improved.

In the method of preparing a polymer according to one embodiment of the present invention, the second polymer mixture may be further polymerized in a third reactor in order to increase the final polymerization conversion rate. In addition, a third polymer mixture discharged from the third reactor may be further polymerized in a fourth reactor.

Meanwhile, when polymerization is completed, the finally obtained polymer mixture may be transferred to a devolatilization tank in order to remove unreacted monomers and solvents comprised in the finally obtained polymer mixture. The temperature of the devolatilization tank may be 225 to 250° C., and the pressure may be 18 torr or less. When the above-described conditions are satisfied, the unreacted monomers and the solvents are easily volatilized to prepare a high-purity copolymer.

Hereinafter, preferred examples are presented to help the understanding of the present invention, but the following examples are merely illustrative of the present invention, and it will be apparent to those skilled in the art that various changes and modifications are possible within the scope and spirit of the present invention, and it goes without saying that such variations and modifications fall within the scope of the appended claims.

Example 1

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 130° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 43.1%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.

<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Example 2

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 47.3%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Example 3

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 140° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 150° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 51.6%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index:

1.516), and 0.2 parts by weight of an antioxidant (Irganox 1010 from BASF) was prepared.

Example 4

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 145° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 54.9%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Example 5

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 3.0 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 47.6%.

The unreacted monomer and toluene were recovered and removed while continuously adding the second polymer mixture into a devolatilization tank (internal temperature:

235° C. and internal pressure: 15 torr), thereby preparing a polymer in the form of pellets.

Meanwhile, the continuous polymerization in the first and second reactors was performed after reaching a steady state. <Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Example 6

<Preparation of Polymer>

A monomer mixture in which 57.0 parts by weight of methyl methacrylate (MMA), 17.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 2.0 kg/hr and a rate of 9.0 kg/hr, respectively, and continuously polymerized while staying in the second reactor for 2.6 hours to prepare a second polymer mixture. Meanwhile, the time at which the continuous addition of the acrylonitrile and the first polymer mixture into the second reactor was started was a time when a polymerization conversion rate was 47.8%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state. <Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.517), and 0.2 parts by weight of an antioxidant (Irganox 1010 from BASF) was prepared.

Example 7

<Preparation of Polymer>

A monomer mixture in which 57.0 parts by weight of methyl methacrylate (MMA), 17.4 parts by weight of styrene (ST), 5.6 parts by weight of acrylonitrile (AN), 20 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 145 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 2.5 kg/hr and a rate of 9 kg/hr, respectively, and continuously polymerized while staying in the second reactor for 2.5 hours to prepare a second polymer mixture. Meanwhile, the time at which the continuous addition of the acrylonitrile and the first polymer mixture into the second reactor was started was a time when a polymerization conversion rate was 47.5%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state. <Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Comparative Example 1

<Preparation of Polymer>

A monomer mixture in which 49.4 parts by weight of methyl methacrylate (MMA), 16.2 parts by weight of styrene (ST), 16.7 parts by weight of acrylonitrile (AN), 17.6 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 11.0 kg/hr, and was continuously polymerized while staying in the first reactor for 2.1 hours to prepare a first polymer mixture.

The first polymer mixture was continuously added into a second reactor (internal temperature: 145° C.) at a rate of 11.0 kg/hr, and was continuously polymerized while staying in the second reactor for 2.6 hours to prepare a second polymer mixture. Meanwhile, the time at which the continuous addition of the first polymer mixture into the second reactor was started was a time when a polymerization conversion rate was 61.2%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state. <Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Comparative Example 2

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 135° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 0.8 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 47.9%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Comparative Example 3

<Preparation of polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 120° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 35.7%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index:

1.516), and 0.2 parts by weight of an antioxidant (Irganox 1010 from BASF) was prepared.

Comparative Example 4

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 160° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 1.2 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 59.9%.

The unreacted monomer and toluene were recovered and removed while continuously adding the second polymer mixture into a devolatilization tank (internal temperature: 235° C. and internal pressure: 15 torr), thereby preparing a polymer in the form of pellets.

Meanwhile, the continuous polymerization in the first and second reactors was performed after reaching a steady state.
<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Comparative Example 5

<Preparation of Polymer>

A monomer mixture in which 56.0 parts by weight of methyl methacrylate (MMA), 18.4 parts by weight of styrene (ST), 5.6 parts by weight of acrylonitrile (AN), 20.0 parts by weight of toluene (TLN), and 0.03 parts by weight of 1,1-bis(t-butylperoxy)cyclohexane were mixed was prepared.

The monomer mixture was continuously added into a first reactor (internal temperature: 160° C.) at a rate of 9.0 kg/hr, and was continuously polymerized while staying in the first reactor for 2.6 hours to prepare a first polymer mixture.

Acrylonitrile and the first polymer mixture were continuously added into a second reactor (internal temperature: 145° C.) at a rate of 5.0 kg/hr and a rate of 9.0 kg/hr, respectively, and continuously polymerized while staying in the second reactor for 2.8 hours to prepare a second polymer mixture. Meanwhile, the time at which the continuous addition of the acrylonitrile and the first polymer mixture into the second reactor was started was a time when a polymerization conversion rate was 47.6%.

The unreacted monomer and toluene were recovered and removed while continuously adding the second polymer mixture into a devolatilization tank (internal temperature:

235° C. and internal pressure: 15 torr), thereby preparing a polymer in the form of pellets.

Meanwhile, the continuous polymerization in the first and second reactors was performed after reaching a steady state.

<Preparation of Thermoplastic Resin Composition>

A thermoplastic resin composition containing 70 parts by weight of the polymer, 30 parts by weight of a diene-based graft polymer (TR550 from LG Chem, a graft polymer obtained by polymerizing methyl methacrylate, styrene, and acrylonitrile to a butadiene rubber polymer, refractive index: 1.516), and 0.2 parts by weight of an antioxidant (Irganox 1010 from BASF) was prepared.

Experimental Example 1

The composition and polymerization conversion rate of each of the polymers of Examples and Comparative Examples were measured or calculated by the method described below, and the results are shown in Tables 1 to 3 below.

1) Composition of polymer (wt %): The composition of the polymer was analyzed by obtaining nitrogen and oxygen contents using an elemental analyzer (EA3000, manufactured by Eurovector).

Experimental Example 2

A physical property of each of the polymers of Examples and Comparative Examples was measured by the method described below, and the results are shown in Tables 1 to 3 below.

1) b value: b value was measured using a HunterLab colorimeter.

Experimental Example 3

Specimens were prepared by extrusion and injection of the thermoplastic resin compositions of Examples and Comparative Examples. Physical properties of the specimens were measured by the methods described below, and the results are shown in Tables 1 to 3 below.

1) Haze (%): The haze of the specimen (thickness: 3.175 mm) was measured according to ASTM D1003.

(2) Izod impact strength (kgf·cm/cm, ¼ In): It was measured according to ASTM D265 at 25° C.

3) Alcohol resistance: After fixing the specimen to a jig of 1.0% stress, isopropyl alcohol (concentration: 100% by weight) was impregnated in the specimen, and left for 5 hours, then whether cracks and fractures occurred was checked.

ο: No cracks and no fractures

Δ: Cracks, and no fractures x: Cracks and fractures

TABLE 1

| | Classification | Example 1 | Example 2 | Example 3 | Example 4 | Example 5 |
|---|---|---|---|---|---|---|
| Monomer mixture (parts by weight) | MMA | 56.0 | 56.0 | 56.0 | 56.0 | 56.0 |
| | ST | 18.4 | 18.4 | 18.4 | 18.4 | 18.4 |
| | AN | 5.6 | 5.6 | 5.6 | 5.6 | 5.6 |
| | TLN | 20.0 | 20.0 | 20.0 | 20.0 | 20.0 |
| | Initiator | 0.03 | 0.03 | 0.03 | 0.03 | 0.03 |
| First reactor | Internal temperature (° C.) | 130 | 140 | 135 | 145 | 135 |
| | Monomer mixture (kg/hr) | 9.0 | 9.0 | 9.0 | 9.0 | 9.0 |
| Second reactor | Internal temperature (° C.) | 145 | 145 | 150 | 145 | 145 |
| | Addition point (Polymerization conversion rate, %) | 43.1 | 47.3 | 51.6 | 54.9 | 47.6 |
| | AN (kg/hr) | 1.2 | 1.2 | 1.2 | 1.2 | 3.0 |
| | First polymer mixture (kg/hr) | 9.0 | 9.0 | 9.0 | 9.0 | 9.0 |
| Composition of added monomers (wt %) | MMA | about 59.3 | about 60.0 | about 60.0 | about 60.7 | about 50.1 |
| | ST | about 20.5 | about 19.7 | about 19.7 | about 18.8 | about 15.8 |
| | AN | about 20.2 | about 20.3 | about 20.3 | about 20.5 | about 34.1 |
| | Weight ratio of AN added into first and second reactors | about 30:70 | about 30:70 | about 30:70 | about 30:70 | about 14:86 |
| Composition of polymers (wt %) | MMA MU | 59.1 | 59.9 | 60.1 | 60.9 | 49.9 |
| | ST MU | 20.3 | 19.5 | 19.3 | 18.6 | 16.1 |
| | AN MU | 20.6 | 20.5 | 20.7 | 20.5 | 34.0 |
| Polymer properties | Refractive index | 1.5162 | 1.5157 | 1.5154 | 1.5151 | 1.5159 |

TABLE 1-continued

| Classification | | Example 1 | Example 2 | Example 3 | Example 4 | Example 5 |
|---|---|---|---|---|---|---|
| Specimen properties | Haze | 1.5 | 1.6 | 1.5 | 1.4 | 1.7 |
| | Impact strength | 13.9 | 13.4 | 13.7 | 14.1 | 17.1 |
| | Alcohol resistance | ○ | ○ | ○ | ○ | ○ |

MMA: Methyl Methacrylate
MMA MU: Methyl Methacrylate Monomer Unit
ST: Styrene
ST MU: Styrene Monomer Unit
AN: Acrylonitrile
AN MU: Acrylonitrile Monomer Unit
TLN: Toluene
Initiator: 1,1-bis(t-butylperoxy)cyclohexane

TABLE 2

| Classification | | Example 6 | Example 7 |
|---|---|---|---|
| Monomer mixture (parts by weight) | MMA | 57.0 | 57.0 |
| | ST | 17.4 | 17.4 |
| | AN | 5.6 | 5.6 |
| | TLN | 20.0 | 20.0 |
| | Initiator | 0.03 | 0.03 |
| First reactor | Internal temperature (° C.) | 135 | 135 |
| | Monomer mixture (kg/hr) | 9.0 | 9.0 |
| Second reactor | Internal temperature (° C.) | 145 | 145 |
| | Addition point (Polymerization conversion rate, %) | 47.8 | 47.5 |
| | AN (kg/hr) | 2.0 | 2.5 |
| | First polymer mixture (kg/hr) | 9.0 | 9.0 |
| Composition of added monomers (wt %) | MMA | about 55.8 | about 52.9 |
| | ST | about 17.0 | about 16.1 |
| | AN | about 27.2 | about 31.0 |

TABLE 2-continued

| Classification | | Example 6 | Example 7 |
|---|---|---|---|
| Weight ratio of AN added into first and second reactors | | about 20:80 | about 17:83 |
| Composition of polymers (wt %) | MMA MU | 53.3 | 51.9 |
| | ST MU | 17.1 | 15.4 |
| | AN MU | 29.6 | 32.7 |
| Polymer properties | Refractive index | 1.5160 | 1.5152 |
| Specimen properties | Haze | 1.7 | 1.4 |
| | Impact strength | 15.7 | 16.4 |
| | Alcohol resistance | ○ | ○ |

MMA: Methyl Methacrylate
MMA MU: Methyl Methacrylate Monomer Unit
ST: Styrene
ST MU: Styrene Monomer Unit
AN: Acrylonitrile
AN MU: Acrylonitrile Monomer Unit
TLN: Toluene
Initiator: 1,1-bis(t-butylperoxy)cyclohexane

TABLE 3

| Classification | | Comparative Example 1 | Comparative Example 2 | Comparative Example 3 | Comparative Example 4 | Comparative Example 5 |
|---|---|---|---|---|---|---|
| Monomer mixture (parts by weight) | MMA | 49.4 | 56.0 | 56.0 | 56.0 | 56.0 |
| | ST | 16.2 | 18.4 | 18.4 | 18.4 | 18.4 |
| | AN | 16.7 | 5.6 | 5.6 | 5.6 | 5.6 |
| | TLN | 17.6 | 20.0 | 20.0 | 20.0 | 20.0 |
| | Initiator | 0.03 | 0.03 | 0.03 | 0.03 | 0.03 |
| First reactor | Internal temperature (° C.) | 135 | 135 | 120 | 160 | 135 |
| | Monomer mixture (kg/hr) | 11.0 | 9.0 | 9.0 | 9.0 | 9.0 |
| Second reactor | Internal temperature (° C.) | 145 | 145 | 145 | 145 | 145 |
| | Addition point (Polymerization conversion rate, %) | 61.2 | 47.9 | 35.7 | 59.9 | 47.6 |
| | AN (kg/hr) | 0 | 0.8 | 1.2 | 1.2 | 5.0 |
| | First polymer mixture (kg/hr) | 11.0 | 9.0 | 9.0 | 9.0 | 9.0 |
| Composition of added monomers (wt %) | MMA | about 60.0 | about 63.0 | about 59.3 | about 61.0 | about 43.8 |
| | ST | about 19.7 | about 20.7 | about 20.8 | about 18.9 | about 14.8 |
| | AN | about 20.3 | about 16.3 | about 19.9 | about 20.1 | about 41.4 |
| Weight ratio of AN added into first and second reactors | | — | about 39:61 | about 30:70 | about 30:70 | about 9:91 |
| Composition of polymers (wt %) | MMA MU | 60.3 | 62.8 | 59.1 | 60.4 | 43.6 |
| | ST MU | 19.6 | 20.9 | 20.5 | 19.2 | 14.9 |
| | AN MU | 20.1 | 16.3 | 20.4 | 20.4 | 41.5 |

TABLE 3-continued

| Classification | | Comparative Example 1 | Comparative Example 2 | Comparative Example 3 | Comparative Example 4 | Comparative Example 5 |
|---|---|---|---|---|---|---|
| Polymer properties | Refractive index | 1.5156 | 1.5158 | 1.5165 | 1.5150 | 1.5174 |
| Specimen properties | Haze | 2.8 | 1.6 | 1.9 | 2.5 | 3.2 |
| | Impact strength | 11.1 | 9.8 | 11.2 | 9.5 | 7.3 |
| | Alcohol resistance | Δ | Δ | ○ | Δ | Δ |

MMA: Methyl Methacrylate
MMA MU: Methyl Methacrylate Monomer Unit
ST: Styrene
ST MU: Styrene Monomer Unit
AN: Acrylonitrile
AN MU: Acrylonitrile Monomer Unit
TLN: Toluene
Initiator: 1,1-bis(t-butylperoxy)cyclohexane Referring to Tables 1 to 3, in Examples 1 to 7, it was found that the refractive index is not deteriorated even when a content of the acrylonitrile monomer unit comprised in the polymer was high, so that the haze value of the specimen was low, the impact strength was high, and the alcohol resistance was excellent. However, in Comparative Example 1 in which the acrylonitrile was not dividedly added, the impact strength and alcohol resistance of the specimen were deteriorated, and the haze value was increased even though the acrylonitrile was added at the same level as in Examples 1 to 7. In Comparative Example 2, in which the weight ratio of acrylonitrile added into the first and second reactors was about 39:61, and a small amount of acrylonitrile was added compared to Examples 1 to 7, the impact strength and alcohol resistance were significantly deteriorated compared with Examples 1 to 7.

Meanwhile, comparing Examples 1 to 5 with Comparative Example 3 in which the time of starting the continuous addition of the second vinyl cyanide-based monomer and the first polymer mixture was a time when the polymerization conversion rate was 35.7%, the haze value of the specimen was increased, and the impact strength was deteriorated, compared to Examples 1 to 5.

In Comparative Example 4 in which the time of starting the continuous addition of the second vinyl cyanide-based monomer and the first polymer mixture was a time when the polymerization conversion rate was 59.9%, the refractive index of the polymer and the haze value of the specimen were increased compared to Examples 1 to 5. In addition, the impact strength and alcohol resistance of the specimen were significantly deteriorated.

The invention claimed is:

1. A method of preparing a polymer, comprising:
preparing a first polymer mixture by polymerizing while continuously adding a monomer mixture comprising a (meth) acrylate-based monomer, a vinyl aromatic monomer, and a first vinyl cyanide-based monomer to a first reactor; and
preparing a second polymer mixture by polymerizing while continuously adding a second vinyl cyanide-based monomer and the first polymer mixture to a second reactor, wherein a starting time of the continuous addition of the second vinyl cyanide-based monomer and the first polymer mixture is a time when a polymerization conversion rate is 40.0 to 55.0%, and
a weight ratio of the first vinyl cyanide-based monomer and the second vinyl cyanide- based monomer is 10:90 to 35:65.

2. The method of preparing a polymer of claim 1, wherein the starting time of the continuous addition of the second vinyl cyanide-based monomer and the first polymer mixture is a time when the polymerization conversion rate is 40.0 to 50.0%.

3. The method of preparing a polymer of claim 1, wherein the weight ratio of the first vinyl cyanide-based monomer and the second vinyl cyanide-based monomer is 20:80 to 30:70.

4. The method of preparing a polymer of claim 1, wherein a sum of a content of the first vinyl cyanide-based monomer and the second vinyl cyanide-based monomer is 20.0 to 30.0 parts by weight based on 100 parts by weight of a total amount of monomers added in the method of preparing the polymer.

5. The method of preparing a polymer of claim 1, wherein a content of the (meth)acrylate-based monomer is 50.0 to 65.0 parts by weight based on 100 parts by weight of a total amount of monomers added in the method of preparing the polymer.

6. The method of preparing a polymer of claim 1, wherein a content of the vinyl aromatic monomer is 15.0 to 25.0 parts by weight based on 100 parts by weight of a total amount of monomers added in the method of preparing the polymer.

7. The method of preparing a polymer of claim 1, wherein an internal temperature of the second reactor is higher than an internal temperature of the first reactor.

8. The method preparing a polymer of claim 7, wherein the internal temperature of each of the first reactor and the second reactor is 130 to 150° C.

9. The method of preparing a polymer of claim 1, wherein the polymerizing in each of the preparing of the first and second polymer mixtures is continuous polymerization.

* * * * *